(12) United States Patent
Noel

(10) Patent No.: US 11,945,750 B1
(45) Date of Patent: Apr. 2, 2024

(54) METHOD FOR RECYCLING RESIDUAL PAINT COLORANT FROM EMPTY PAINT COLORANT CONTAINERS AND PRODUCTS MADE THEREFROM

(71) Applicant: Jerry Wayne Noel, Sacramento, CA (US)

(72) Inventor: Jerry Wayne Noel, Sacramento, CA (US)

(\*) Notice: Subject to any disclaimer, the term of this patent is extended or adjusted under 35 U.S.C. 154(b) by 246 days.

(21) Appl. No.: 17/230,704

(22) Filed: Apr. 14, 2021

(51) Int. Cl.
| | |
|---|---|
| C04B 18/00 | (2006.01) |
| B09B 3/00 | (2022.01) |
| B09B 3/25 | (2022.01) |
| C04B 18/02 | (2006.01) |
| C04B 18/04 | (2006.01) |
| C04B 28/02 | (2006.01) |
| B09B 101/02 | (2022.01) |
| C04B 111/00 | (2006.01) |

(52) U.S. Cl.
CPC ............ *C04B 18/0472* (2013.01); *B09B 3/00* (2013.01); *B09B 3/25* (2022.01); *C04B 18/021* (2013.01); *C04B 28/02* (2013.01); *B09B 2101/02* (2022.01); *C04B 2111/00767* (2013.01)

(58) Field of Classification Search
None
See application file for complete search history.

(56) References Cited

U.S. PATENT DOCUMENTS

| | | | | |
|---|---|---|---|---|
| 1,865,094 | A | * 6/1932 | Fredeen | ............ B03B 5/56 209/291 |
| 5,496,404 | A | * 3/1996 | Price | ............ C04B 18/18 106/407 |
| 5,765,293 | A |   6/1998 | St. Louis et al. | |
| 5,992,774 | A | * 11/1999 | Oh | ............ B03B 9/065 241/20 |
| 7,128,780 | B2 |  10/2006 | Matheson et al. | |
| 2015/0053115 | A1 |   2/2015 | Anglade | |

\* cited by examiner

*Primary Examiner* — Stefanie J Cohen
(74) *Attorney, Agent, or Firm* — John P. Costello

(57) ABSTRACT

The invention is a method for rendering containers having hazardous residual paint colorant non-hazardous, by washing the hazardous residual paint colorant from the containers to a level where the containers are no longer considered to be hazardous waste, at which point the containers can be safely introduced into standard waste recycling streams. The method also proposes washing the hazardous paint colorant out of the containers and using the wash water containing the colorant to make paint, aggregate, and precast concrete structures.

6 Claims, 5 Drawing Sheets

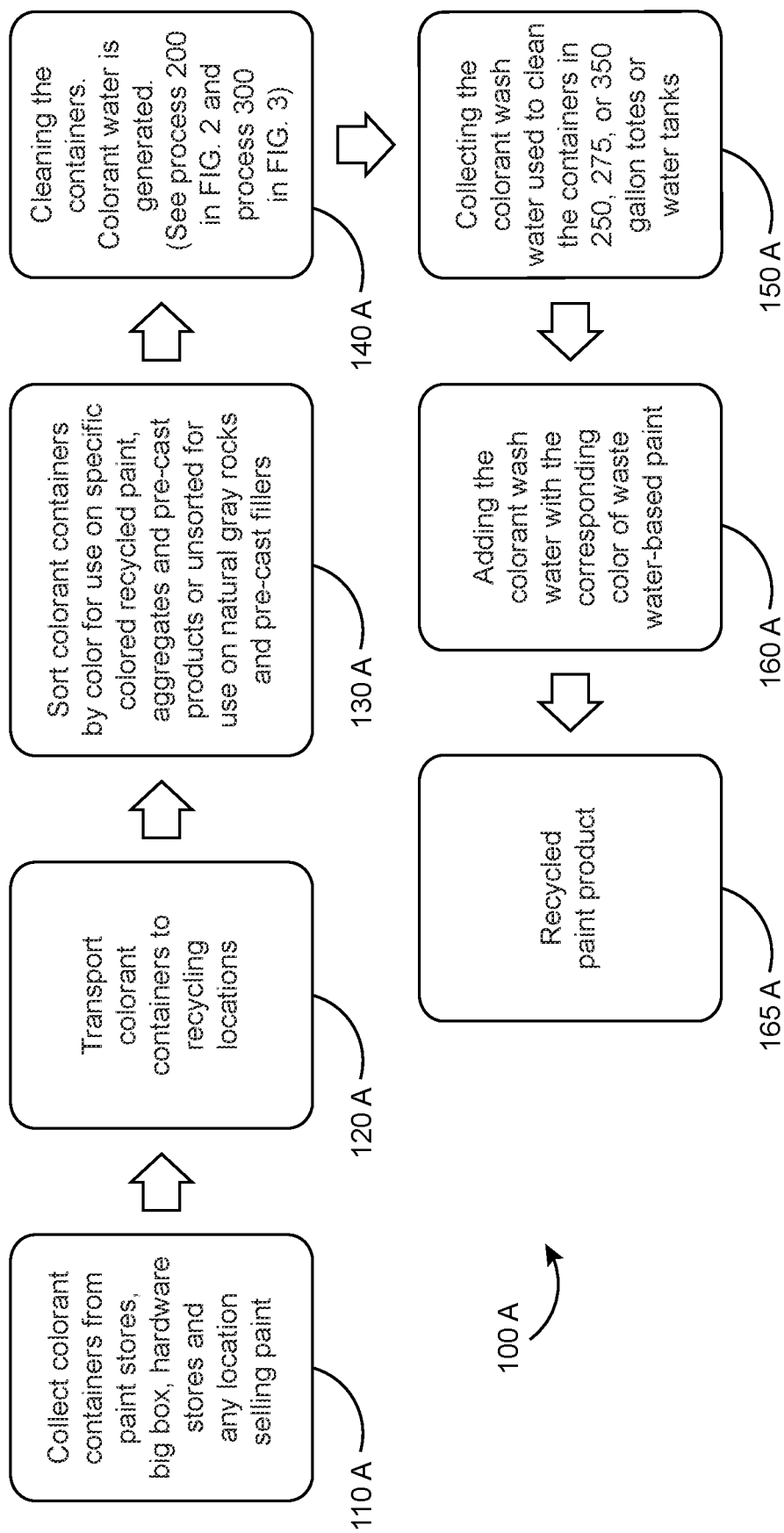

METHOD FOR RECYCLING RESIDUAL PAINT COLORANT FROM EMPTY PAINT COLORANT CONTAINERS AND PRODUCTS MADE THEREFROM

BACKGROUND OF THE DISCLOSURE

Reference to Related Applications

Not Applicable.

TECHNICAL FIELD OF THE DISCLOSURE

The present invention applies to a method for recycling paint colorant from empty paint colorant containers by creating a colorant wash water and using the colorant wash water to make recycled paint, aggregate and precast structures.

DESCRIPTION OF THE RELATED ART

Paint stores and home improvement stores will typically mix paint to the color and tint preferred by a customer. These businesses use paint mixing machines which introduce liquid colorant to a stock paint mixture. The containers correspond to a particular color of liquid colorant (blue, red, yellow, etc.). The containers are typically plastic, but can be metal containers, the plastic and metal being, by themselves, independently recyclable materials. However, presently, these containers cannot be recycled and instead must be classified as hazardous waste due to the small amount of residual colorant in the empty containers. The colorant contains barium and other substances which are highly toxic and cannot be introduced into recycled waste streams. Therefore, presently, the only known solution is for paint store employees to remove the colorant containers from the paint mixing machinery and place the containers into an on-site hazardous waste bin for further processing by an off-site hazardous waste facility. This additional handling and processing of the container at an off-site facility substantially increases the final cost of paint sold by the store, this cost being passed on to the consumer who purchases the mixed paint.

When a colorant container is "empty" there is still residual colorant contained therein. Even small amounts of colorant are toxic, but when mixed with paint, this colorant becomes encapsulated and rendered safe. The colored paint can be applied with impunity and safety once the colorant has been completely mixed and encapsulated by the paint.

The inventor is unaware of any solutions to the problem of toxic residual paint colorant in empty paint colorant containers other than those employed by hazardous waste facilities. The most familiar method used by these facilities is to incinerate the containers in a kiln-type incinerator at a hazardous waste-permitted facility. This process creates fly ash, which retains a toxic quality, this fly ash is collected from the kiln and buried at a hazardous waste landfill. Presently, having to process these containers off-site in this manner adds hundreds of millions of dollars per year to the cost of mixed paint purchased by consumers in the United States.

The foregoing reflects the state of the art of which the inventor is aware and is tendered with a view toward discharging the inventor's acknowledged duty of candor, which may be pertinent to the patentability of the present invention. It is respectfully stipulated, however, that the foregoing discussion does not teach or render obvious, singly or when considered in combination, the inventor's claimed invention.

SUMMARY OF THE DISCLOSURE

The invention proposes a method for rendering containers having residual paint colorant to a non-hazardous state, by washing the hazardous residual paint colorant from the containers to a level where the containers are no longer considered to be hazardous waste. At this point the containers can be safely introduced into standard waste recycling streams. Various embodiments of the invention propose washing the whole colorant containers using a power-washer, or using a specially modified dishwasher, with the objective being to wash the residual paint colorant from the containers and forming a paint colorant wash water. Other embodiments propose shredding the containers and loading the shreds into a washing machine to wash the shreds until they are safely free of paint colorant and generating the colorant wash water. The shreds can then be baled and introduced into a standard waste recycling stream. This shredding method is especially applicable to plastic colorant containers.

The paint colorant wash water from the washing steps can then be sorted by specific, separate wash water color, or avoid the sorting step, which creates a mix of colors, rendering a final gray color. In one embodiment the method describes a step wherein the wash water (sorted or non-sorted) is collected in large totes of 250-gallon to 350-gallon size, for transportation off site. The wash water can also be stored on site in storage tanks. The collected wash water is then used in an aggregate manufacturing process wherein the wash water is mixed with proportions of paint and cement to color the aggregate. The mixing of the wash water with paint and cement effectively encapsulates the paint colorant, thus rendering it into a non-hazardous final aggregate product.

This method would be carried out by collecting empty paint containers from paint stores, big box stores and any location engaged in paint mixing. The containers would be transported off-site to subject the containers to the method described herein, this method would not require any specialized hazardous waste handling and processing of the containers, nor would the high cost of hazardous waste disposal be required.

BRIEF DESCRIPTION OF THE DRAWINGS

FIG. 1A is a flow chart showing an embodiment of the invention where paint colorant is rendered non-hazardous by encapsulating it in waste water-based paint.

DETAILED DESCRIPTION OF THE DRAWINGS

Figure 1B:
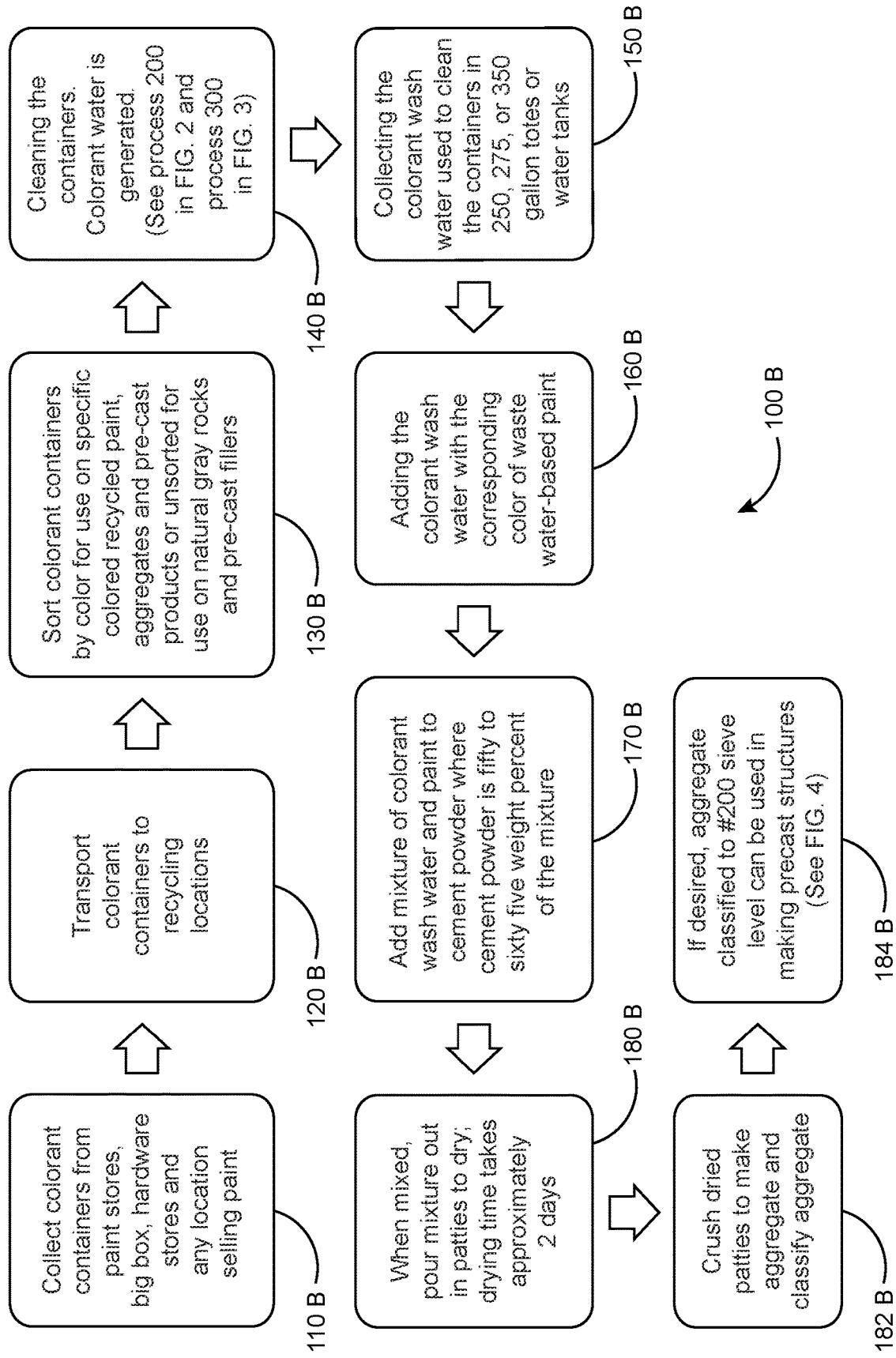
FIG. 1B is a flow chart showing an embodiment of the invention where paint colorant is rendered non-hazardous by encapsulating it in water water-based paint and cement powder.

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized, and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below. The invention will now be described with reference to the accompanying drawings which do not limit the scope and the ambit of the invention. In the following discussion that addresses a number of embodiments and applications of the present invention, reference is made to the accompanying drawings that form a part hereof, and in which is shown by way of illustrating specific embodiments in which the invention may be practiced. It is to be understood that other embodiments may be utilized, and changes may be made without departing from the scope of the present invention.

As used herein, the singular forms "a", "an" and "the" include plural references unless the context clearly dictates otherwise. "And" as used herein is interchangeably used with "or" unless expressly stated otherwise. All embodiments of any aspect of the invention can be used in combination unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas," "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Referring to the drawings, the method for recycling residual paint colorant from paint colorant containers is shown. Paint colorant containers are primarily made from plastic, such as from polypropylene or from high density polyethylene, but a percentage are also made of metal. Whether plastic or metal, these are materials that can be introduced into standard recycling waste streams to be reused as materials in a number of products. Paint colorant is comprised of Barium and other toxic metals, which, up until the present invention, has rendered paint colorant containers hazardous waste, which had to be disposed of in hazardous waste landfills and facilities requiring special handling (such as incineration) and associated waste disposal fees. Even if the containers were washed clean of the paint colorant at a hazardous waste facility, the toxic wash water would present an enormous disposal problem for the facility. The prior art has found it simply easier to incinerate the containers and collect and bury the hazardous fly ash created by this process.

The present invention provides a solution to the problem of waste residual colorant, by providing a conduit through which the colorant can be safely encapsulated, thus rendering it non-hazardous. Additionally, once encapsulated, the colorant combined with encapsulating ingredients, such as waste water-based paint and cement powder allows for conversion to useful products such as recycled paint, colored aggregate, and precast structures.

Referring to FIG. 1A, an embodiment of the invention is represented by process 100 A. Step 110 A has the paint colorant containers being collected from locations which sell paint, such as big box stores, paint stores and hardware stores. Following collection 110 A, the paint colorant containers are then transported to off-site recycling facilities 120 A. Next, the containers can be sorted by color 130 A, if it is desired to create final products having a specific color. In some final products, such as aggregate (See FIG. 1B), a natural gray color is very desirable, this natural gray being achieved through commingling the color containers without employing any sorting step. Upon washing commingled containers, a natural gray wash water is achieved which can then be applied to aggregate or precast products.

Whether sorted or unsorted, the paint colorant containers are subjected to a washing step 140 A. At washing step 140 A, there are two washing process embodiments 200 and 300 (See FIGS. 2 and 3), which can accomplish the washing step 140 A.

Figure 2:
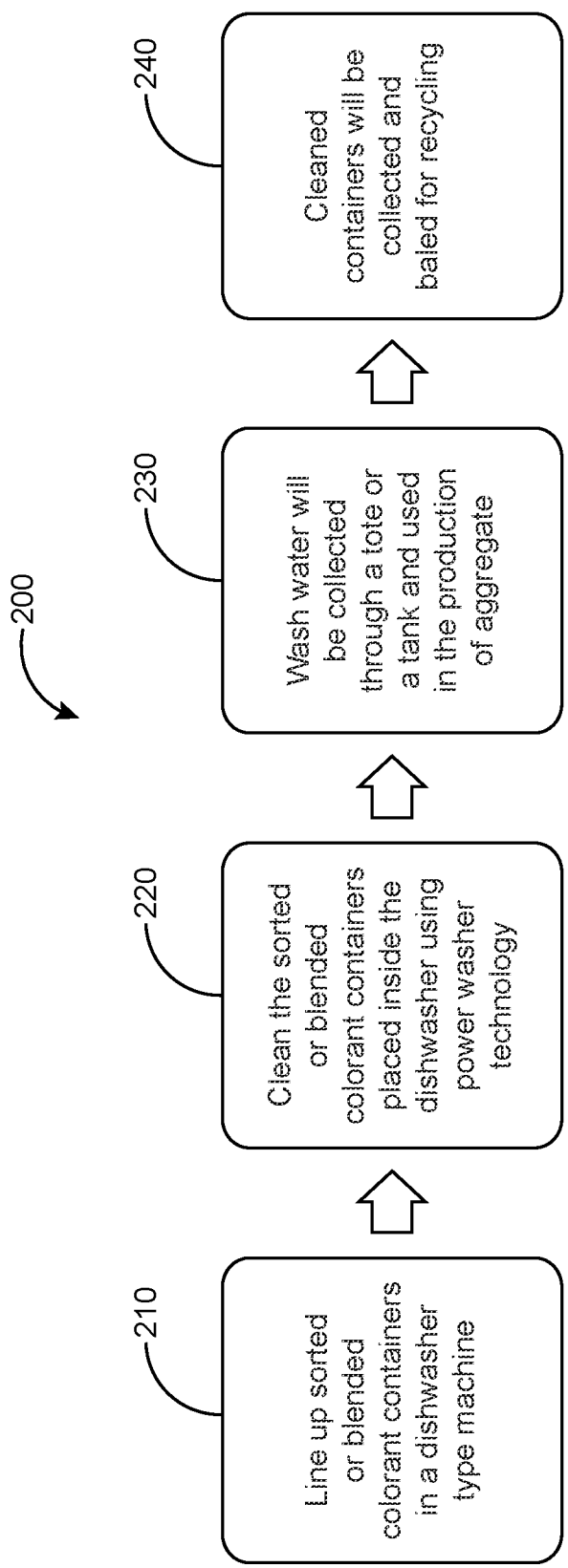
FIG. 2 is a flow chart showing a method of washing paint colorant containers using a machine combining a power washer and a dishwasher.

Referring to FIG. 2, washing process 200 combines the use of a power washer inside of a dishwasher-type machine to clean the paint colorant containers. First, the containers are lined up in the container washing machine. Sorted containers having residual paint colorant of a specific color, or non-sorted blended containers are placed in the container washing machine 210. The container washing machine comprises a power washer which cleans the containers 220 at a high level, removing residual paint colorant. The wash water, resulting from color-sorted or non-sorted containers is collected in a large tote or tank 230. In one embodiment, the inventor has used large plastic totes in the 200-gallon to 350-gallon range to collect the wash water. The wash water contains the hazardous paint colorant, which remains hazardous unless further processing occurs to render the paint colorant into a non-hazardous form. The final step of the washing process 200 is to collect the cleaned, rinsed containers and bale them for recycling 240. At this stage in the cleaning process, the containers are cleaned to a non-hazardous level so that they can enter a standard recycling waste stream. The inventor proposes that the non-hazardous level can be determined by the level of clarity of wash water effluent exiting from the container washing machine 210 at the end of the washing process. This can be done visually, or alternately, through an electronic sensor such as a turbidity indicator.

Figure 3:
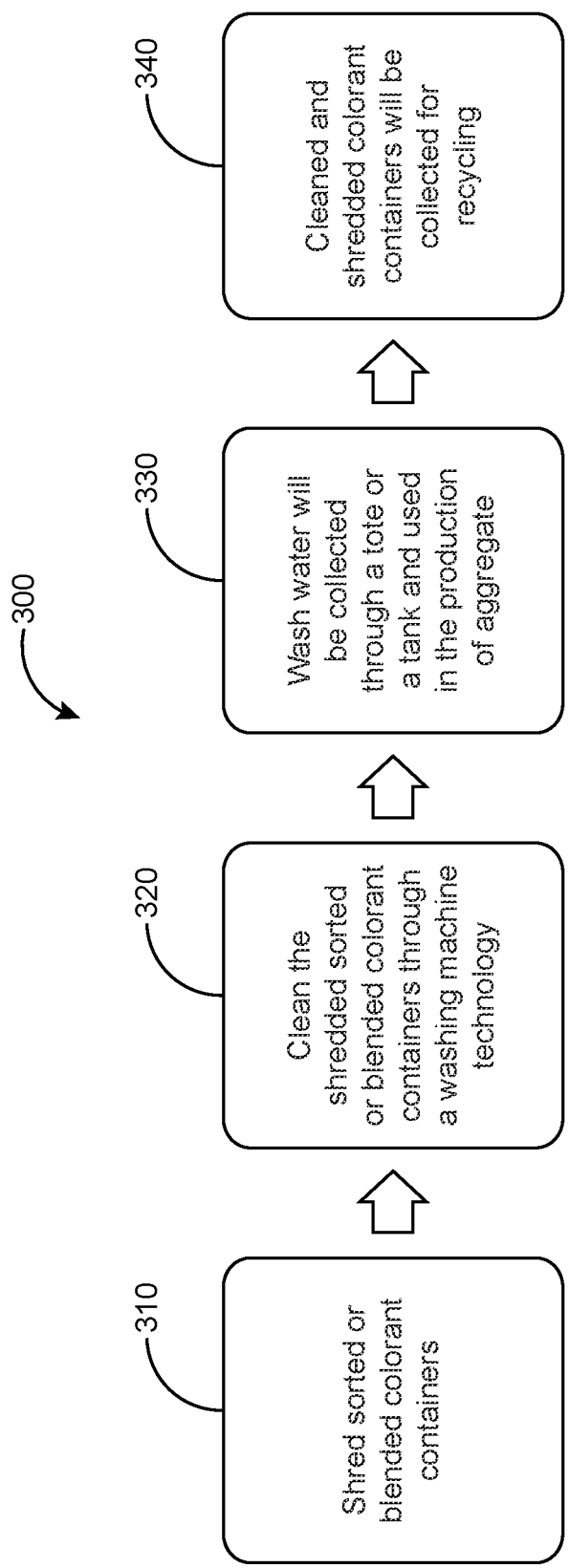
FIG. 3 is a flow chart showing a method of washing paint colorant from paint colorant containers involving shredding the containers and placing the shreds in a washing machine to separate the paint colorant from the shreds.

Referring to FIG. 3, an alternate embodiment of the washing process 300 describes shredding 310 the sorted or non-sorted colorant containers. The shredding of the containers exposes the shreds to full immersion in wash water and lessens the possibility that an odd-shaped container might not be completely cleaned. The sorted or blended shreds are then loaded into a washing machine 320 and put through a washing cycle intended to clean the shreds to a non-hazardous level. The wash water that results from this process contains the hazardous paint colorant, and as with the previous process 200, is collected in large totes, or a tank 330. The cleaned and rinsed shreds are collected for recycling 340.

Referring again to FIG. 1A, the hazardous wash water that was produced (via process 200 or 300) during the washing step 140 A, is collected 150 A in storage tanks or large plastic totes. The next steps in the process are directed toward rendering the hazardous wash water to a non-hazardous form. In step 160 A the invention renders the hazardous wash water into a non-hazardous form by combining waste water-based paint with the wash water to encapsulate the paint colorant diluted in the wash water. This step can render the colorant non-hazardous by combining the paint with a proportion of wash water in a range of ten to sixty weight percent of colorant wash water to water-based paint. Applying the process in FIG. 1A to waste water-based paint results in a recycled paint product 165 A that can be resold to consumers. This mixture of colored wash water with waste water-based paint results in a paint product of the right consistency to be reused for painting purposes, which can be easily applied to surfaces through spraying or other common paint application means. In this finished recycled paint product, the formerly hazardous colorant is fully encapsulated and is safe to apply. In one embodiment, step 160 A can be implemented where the waste paint color and the wash water color are the same specific color, such as where blue paint is combined with blue wash water, red paint with red wash water and so on. This step 160 A envisions employing waste paint from waste paint recycling facilities. In the case of gray wash water resulting from washing unsorted paint colorant containers, a gray paint resulting from mixing unsorted quantities of waste paint would be combined with the like-colored gray wash water.

The inventor devised a prior inventive method described in U.S. Pat. No. 10,737,977, entitled "Methods for Recycling Surplus Water-Based Latex Paint and Aggregate Products Made Therefrom". That '977 Patent disclosed methods of recycling waste paint by converting the paint to aggregate and precast concrete structures. The '977 Patent was directed toward converting the maximum amount of waste paint to useful products. In one step of the '977 method, a mixture of cement, waste paint and water is poured on the ground and left to dry: the drying time taking 2-4 months in ambient air.

Referring to FIG. 1B, the present method is directed toward encapsulating the maximal amount of colorant wash water so as to render the toxic colorant into a non-hazardous form, which can be turned into aggregate and precast products. This is achieved under the present method by employing a high cement content with the colorant combined with waste paint in step 170 B. The cement powder added in the process at step 170 B serves to encapsulate the colorant along with the waste water-based paint. The components follow the following preferred ratios. To create a mixture preferred for making aggregate and precast products the proportion of colorant wash water to water-based paint is preferably in a range of thirty to seventy weight percent of colorant wash water to water-based paint. This mixture of colorant wash water to water-based paint is then mixed with cement powder at a weight percent of cement powder ranging from fifty weight percent to sixty-five weight percent of the aggregate mixture.

Step 180 B requires that the mixture of colorant wash water, water-based paint and cement powder be worked in a cement mixer, for example, the objective being to achieve a mixture which encapsulates the colorant, employing the encapsulating properties of the water-based paint and cement. In step 180 B, the mixture is poured from the mixer onto the ground to form patties, which dry in approximately 2 days in ambient air. The patties are then crushed 182 B into aggregate, the amount of crushing being applied is dependent on the approximate size of aggregate desired. In a step 182 B, the aggregate is classified into aggregate sizes. If sorting of colorant containers is employed to obtain specifically colored wash water (red, green, blue) the aggregate will likewise be produced in specific colors, which can add an attractive quality for use in landscaping for example. If the colorants are not sorted, the blended colorants will produce a gray aggregate, not unlike crushed gravel, and can be used in landscaping or paving roads, for example.

The present invention enjoys an advantage over the inventor's '977 Patent invention in that the drying time of approximately 2 days in ambient air (70 degrees Fahrenheit) versus 2-4 months, ensures that aggregate can be produced at a higher volume by a significant margin. The '977 Patent could speed up the process of drying by using drying chambers, but this requires significant additional energy. The present method uses less waste paint per batch than the process of the '977 Patent, yet the weight percentages of waste paint per aggregate batch are in a range of 15 to 35 weight percent, compared to 40 to 60 weight percent of the '977 Patent. The quick-dry aspect of the present invention allows for more waste paint to be recycled, due to more batches being manufactured, per unit of time, and therefore, more aggregate is made per unit of time. For example, in a span of time, the present process could conceivably make five batches of aggregate, whereas the '977 Patent process is still in its drying phase for one batch, provided the aggregate patty is dried in ambient air. Additionally, the present invention does not require drying agents such as "high early" be added to the mixture as is the case in the '977 method. The present invention therefore holds out the possibility of a much more easily managed production cycle in terms of supply and demand. If a high demand phase for aggregate occurs, the present invention can ramp up production and meet demand more easily and efficiently than the '977 Patent process.

Figure 4:
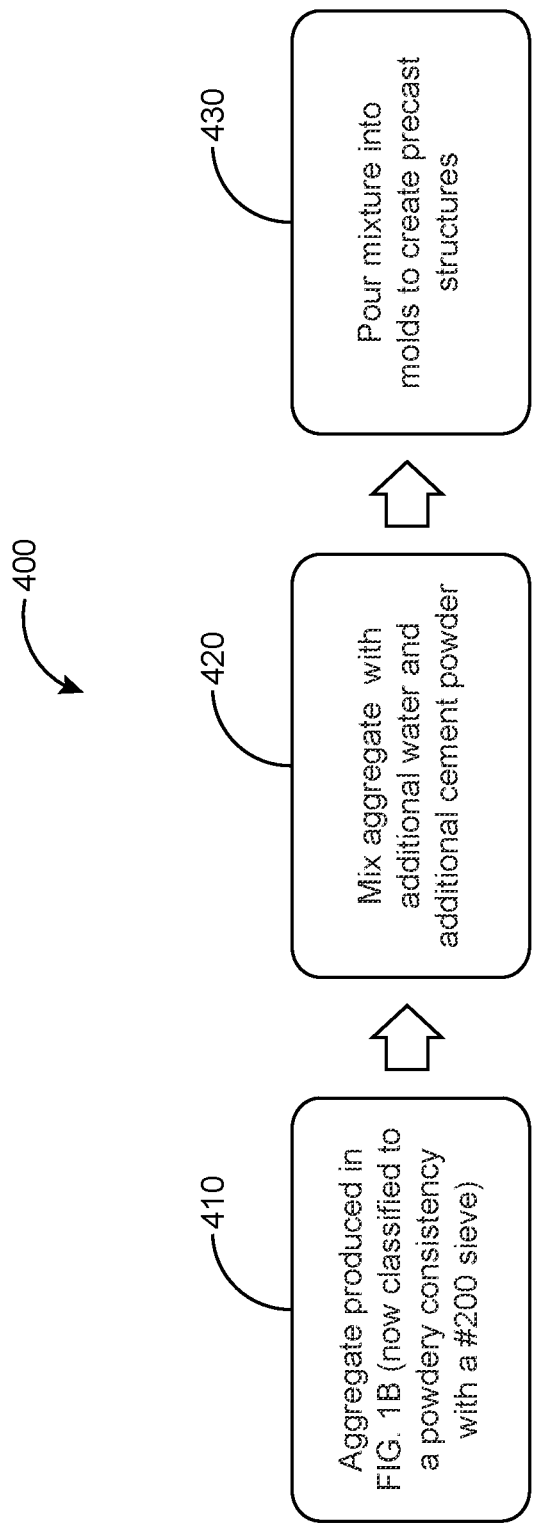
FIG. 4 is a flow chart showing how the aggregate made by the invention is rendered into precast concrete products.

Classification sizes of ¾" to ⅜" are best for most aggregate applications such as landscaping and graveling roads. When the aggregate is crushed and classified to #200 mesh, it is a powdery substance at this stage, which is ideal for use in precast concrete manufacturing (See additional step 184 B of FIG. 1B). Referring to FIG. 4, the use of the aggregate in precast manufacturing 400 is shown. Taking the aggregate produced in FIG. 1B (now classified to a powdery consistency with a #200 sieve) 410, the aggregate is next mixed with water and additional cement powder until a customer's specified strength profile is achieved 420. The mixture is then poured into molds 430 to create precast structures. The inventor has used this precast process to make car tire stops and steppingstones, for example.

The present method therefore provides a two-fold recycling benefit in that hazardous colorant is encapsulated and waste paint is recycled in each batch. Whether the end product is recycled paint, aggregate or precast concrete products, each of these represent a new avenue for encapsulating and rendering hazardous colorant into a non-hazardous form. The prior art industry of incinerating colorant containers in fire kilns and then removing the residual hazardous ash to a hazardous waste landfill is eliminated by this invention. This prior art incineration method generates hundreds of millions of dollars per year for the hazardous waste industry yet does not render the hazardous waste stream into a non-hazardous state. The present invention can replace the prior art incineration method and render hazardous colorant to a non-hazardous state, while generating saleable products.

The foregoing description of the preferred embodiments of the present invention has been presented for the purpose of illustration and description. It is not intended to be exhaustive or to limit the invention to the precise form disclosed. Many modifications and variations are possible in light of the above teachings. It is intended that the scope of the present invention is not limited by this detailed description, but by the claims and the equivalents to the claims appended hereto.

What is claimed is:

1. A process for making aggregate from water-based paint, paint colorant and cement powder, the process comprising the steps of:
   1) providing wash water having paint colorant;
   2) adding a quantity of the wash water from step (1) to a quantity of water-based paint, the proportion of colorant wash water to water-based paint being preferably in the range of thirty weight percent to seventy weight percent of colorant wash water to water-based paint and mixing the wash water with the water-based paint;
   3) adding a quantity of cement powder to the mixture from step (2);
   4) working the mixture of step (3) until thoroughly mixed;
   5) drying the mixture of step (4);
   6) crushing the dried mixture of step (5) into aggregate;
   7) classifying the aggregate from step (6).

2. The process for making aggregate as recited in claim 1, wherein the drying step further comprises transferring the mixture to a drying oven.

3. The process for making aggregate as recited in claim 1, wherein the drying step further comprises pouring the mixture onto the ground and waiting approximately two days for the mixture to dry in ambient air.

4. The process for making aggregate as recited in claim 3, wherein the ambient air is maintained at a temperature of at least 70 degrees Fahrenheit throughout the drying time of approximately two days.

5. The process for making aggregate as recited in claim 1, wherein in step (3) the mixture of colorant wash water and water-based paint is mixed with cement powder at a weight percent of cement powder ranging from fifty weight percent to sixty-five weight percent.

6. A process for making a batch of aggregate from water-based paint, paint colorant and cement powder, the process comprising the steps of:
   1) providing wash water having paint colorant;
   2) adding a quantity of the wash water from step (1) to a quantity of water-based paint, the weight percentage of water-based paint per batch of aggregate being in a range of fifteen to thirty-five weight percent;
   3) adding a quantity of cement powder to the mixture from step (2);
   4) working the mixture of step (3) until thoroughly mixed;
   5) drying the mixture of step (4);
   6) crushing the dried mixture of step (5) into aggregate;
   7) classifying the aggregate from step (6).

* * * * *